United States Patent
Ogawa

Patent Number: 5,432,594
Date of Patent: Jul. 11, 1995

[54] OPTICAL DISTANCE MEASUREMENT DEVICE USING IMAGE SENSORS FOR DETERMINING DISTANCE TO SYMMETRIC OBJECTS

[75] Inventor: Kenji Ogawa, Himeji, Japan

[73] Assignee: Mitsubishi Denki Kabushiki Kaisha, Tokyo, Japan

[21] Appl. No.: 111,854

[22] Filed: Aug. 26, 1993

[30] Foreign Application Priority Data

Aug. 28, 1992 [JP] Japan .................................. 4-229684

[51] Int. Cl.$^6$ .......................... G01C 3/00; G01C 5/00; B60T 7/16
[52] U.S. Cl. ..................... 356/3.14; 180/167; 250/201.6; 354/408
[58] Field of Search ..................... 354/402, 408; 356/1; 250/201.6; 180/167

[56] References Cited

U.S. PATENT DOCUMENTS

| | | | |
|---|---|---|---|
| 4,916,302 | 4/1990 | Sorimachi . | |
| 4,947,202 | 8/1990 | Kitajima et al. | 354/403 |
| 5,023,712 | 6/1991 | Kajiwara . | |
| 5,131,740 | 7/1992 | Maekawa | 356/1 |
| 5,159,557 | 10/1992 | Ogawa | 364/460 |

FOREIGN PATENT DOCUMENTS 0488392  6/1992  European Pat. Off. .

Primary Examiner—Stephen C. Buczinski
Attorney, Agent, or Firm—Sughrue, Mion, Zinn, Macpeak and Seas

[57] ABSTRACT

An optical distance measurement device for determining the distance to a object 5 exhibiting a bilateral symmetry, such as an automobile, includes two optical systems whose optical axes are separated by a lateral distance perpendicular to the axis of symmetry of the object 5. Two images are formed upon the image sensors 3 and 4. A window formed within each image having a width substantially corresponding to the width of the object 5 is successively shifted from left to right within the image, and the symmetry with respect to the central axis thereof is evaluated by the microcomputer 10 at each position of the window. The axis position at which the evaluated degree of symmetry is the greatest is determined for each image. The distance to the object 5 is determined from the amount of shift between the two axis positions, based upon the principle of trigonometry.

4 Claims, 5 Drawing Sheets

OPTICAL DISTANCE MEASUREMENT DEVICE USING IMAGE SENSORS FOR DETERMINING DISTANCE TO SYMMETRIC OBJECTS

BACKGROUND OF THE INVENTION

This invention relates to optical distance measurement devices using image sensors, and more particularly to optical distance measurement devices for continuously measuring the distance to an object, such as an automobile, which exhibits a bilateral symmetry.

FIG. 5 is a diagram showing the principle of a conventional optical distance measurement device using image sensors, which is disclosed, for example, in Japanese Patent Publication (Kokoku) Nos. 63-38085 and 63-46363. As shown in FIG. 5, the optical distance measurement device includes a left and a right optical systems. The lenses 1 and 2 are separated by a base-line length L. Two images of an object 52 are formed upon the image sensors 3 and 4, respectively, positioned at the focal distance f of the respective lenses 1 and 2. A microcomputer 51 calculates the distance R to the object 52 from the shift a between the images formed upon the image sensors 3 and 4.

Namely, the microcomputer 51 superposes upon each other the two images formed upon the image sensors 3 and 4, successively changing the amount of the relative displacement of the two images. The microcomputer 51 thus determines the amount of shift a at which the best match between the two images is found. The distance R to the object 52 is determined based upon the principle of trigonometry by the following equation:

$$R = f \times L / a \tag{1}$$

The above conventional optical distance measurement device, however, has the following disadvantage. The images obtained by the left and right optical systems are compared with each other directly, to determine the distance R. Thus, if the optical axes of the two optical systems are displaced vertically, the agreement of the two images deteriorates, and hence the accuracy of measurement is reduced. Consequently, the vertical positions of axes of the two optical systems must accurately be adjusted. Further, the optical characteristics of the two systems are generally not exactly identical. The disagreement in the contrast and the brightness of the images resulting from the difference in the response characteristics of the auto-irises of the two systems further reduces the agreement of the two images. This is particularly manifest when the brightness of the images changes abruptly. Thus the accuracy of the measurement is further reduced.

SUMMARY OF THE INVENTION

It is therefore an object of this invention to provide an optical distance measurement device which is capable of an accurate and reliable measurement of the distance to a symmetric object even when the optical axes of the two optical systems are vertically displaced or when the two images formed by the two optical systems exhibit variations in the contrast and the brightness.

The above object is accomplished in accordance with the principle of this invention by an optical distance measurement device for detecting a distance to an object exhibiting a substantial bilateral symmetry, which comprises first and second optical systems having optical axes separated from each other by a lateral distance substantially perpendicular to an axis of symmetry of the object, the first and second optical systems forming first and second images, respectively, each having a lateral width extending in a direction perpendicular to the axis of symmetry of the object; symmetric axis calculation means, coupled to the first and second optical systems, for determining lateral positions of first and second symmetric axes of the object of the first and second images, respectively; and shift calculation means, coupled to the symmetric axis calculation means, for calculating a separation between the lateral positions of the first and second symmetric axes; and distance calculation means, coupled to the shift calculation means, for calculating a distance to the object from the separation between the lateral positions of the first and second symmetric axes.

Preferably, the symmetric axis calculation means includes: means for forming a window within the first and second images, the window having a lateral width substantially corresponding to a width of the object; means for laterally translating the window within the first and second images; evaluation means for evaluating a degree of symmetry of an image within the window with respect to a central axis thereof; and means, coupled to the evaluation means, for determining a position of the central axis of the window within the first and second images at which the degree of symmetry evaluated by the evaluation means is at a maximum, the positions of the central axes within the first and second images constituting the lateral positions of symmetric axes within the first and second images. It is preferred that the first and second optical systems include image sensors upon which the first and second images are formed. It is further preferred that the distance calculation means calculates the distance to the object, on the basis of the separation between the lateral positions of the first and second symmetric axes, based on a principle of trigonometry.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 4b shows the right image 12 stored in the memory 9, together with the positions $X_1$ and $X_2$ of the axes of symmetry of the left and the right images, wherein the amount of shift between the two axes of symmetry is represented by a.

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
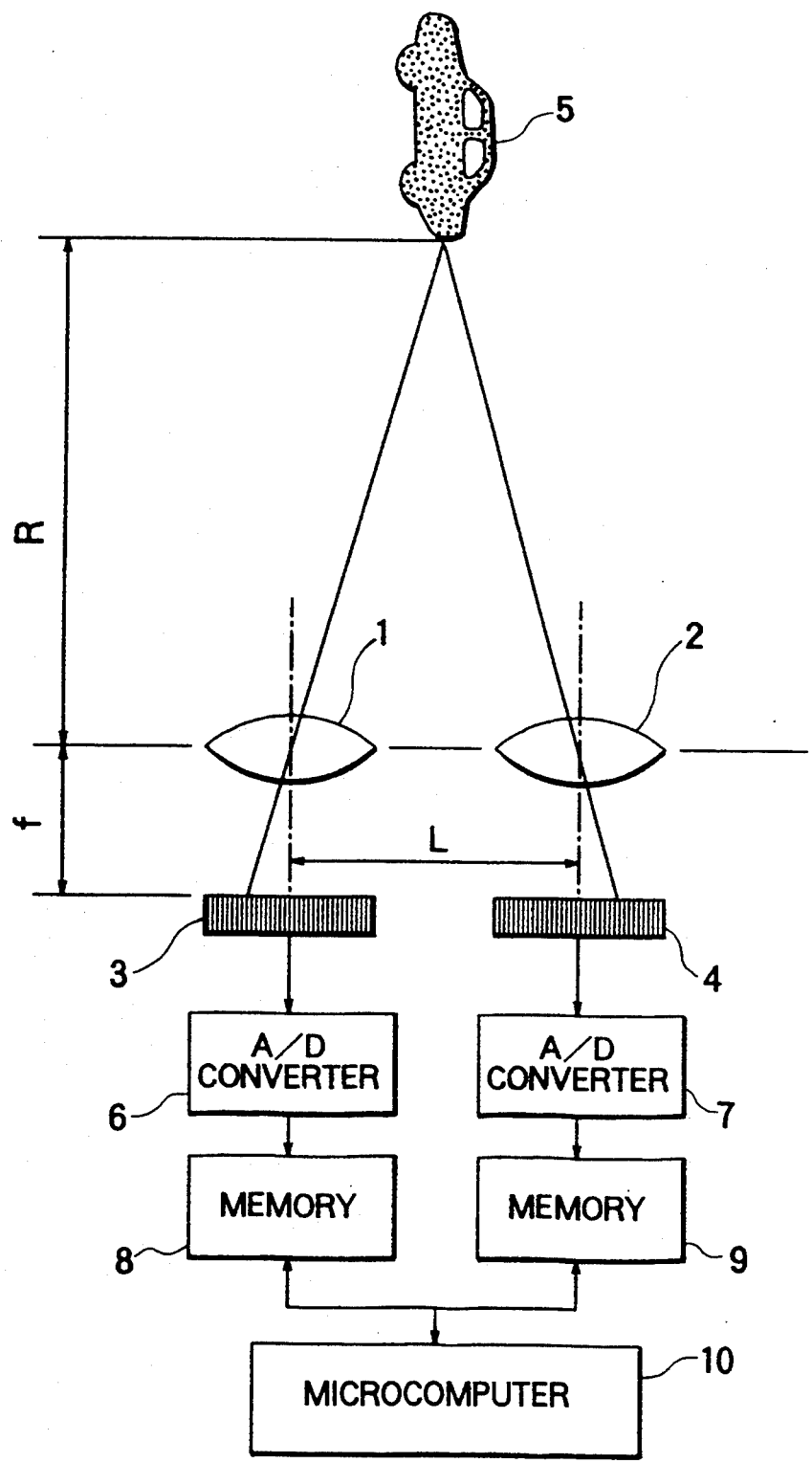
FIG. 1 is a block diagram showing the structure of an optical distance measurement device according to this invention.

FIG. 1 is a block diagram showing the structure of an optical distance measurement device according to this invention. The optical distance measurement device includes a left and a right optical system. The lenses 1 and 2 of the respective systems are separated by a base-line length L. The images of an object 5, the distance to which is to be measured by the optical distance measurement device, are formed upon the image sensors 3 and 4 positioned at the focal distance f of the respective lenses 1 and 2. Here the object 5 is assumed to be an automobile exhibiting bilateral symmetry with respect to a vertical axis. The image sensors 3 and 4 each consist of a two-dimensional array of photosensitive elements. The analog output levels of respective photosensitive elements of the image sensors 3 and 4 are converted into corresponding digital levels (e.g., grey levels in 256 gradations, represented in eight bits) by the A/D converters 6 and 7, respectively, and the resulting digital grey level images are stored in respective memories. The digital grey level at the (i,j)th element of the two-dimensional array stored in the memory 8 of the left optical system is represented by $S(i,j)$. Similarly, the digital grey level at the (i,j)th element of the two-dimensional array stored in the memory 9 of the right optical system is represented by $S'(i,j)$. A microcomputer 10 reads out the values $S(i,j)$ and $S'(i,j)$ of the respective elements of the two-dimensional images stored in the memories 8 and 9, and determines the distance R to the object 5 as described below.

Figure 2:
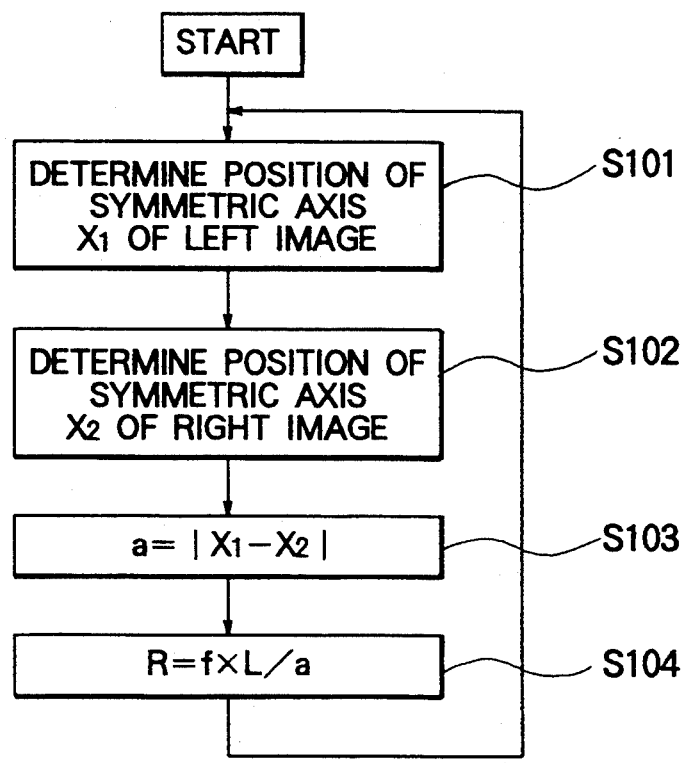
FIG. 2 is a flowchart showing the distance measurement routine followed by the microcomputer of FIG. 1.

FIG. 2 is a flowchart showing the distance measurement routine followed by the microcomputer of FIG. 1. First at step S101, the position of the symmetric axis $X_1$ of the left image formed upon the image sensor 3 and stored in the memory 8 in a digital form is determined. The determination of the position of the axis $X_1$ is performed as follows.

Figure 3:
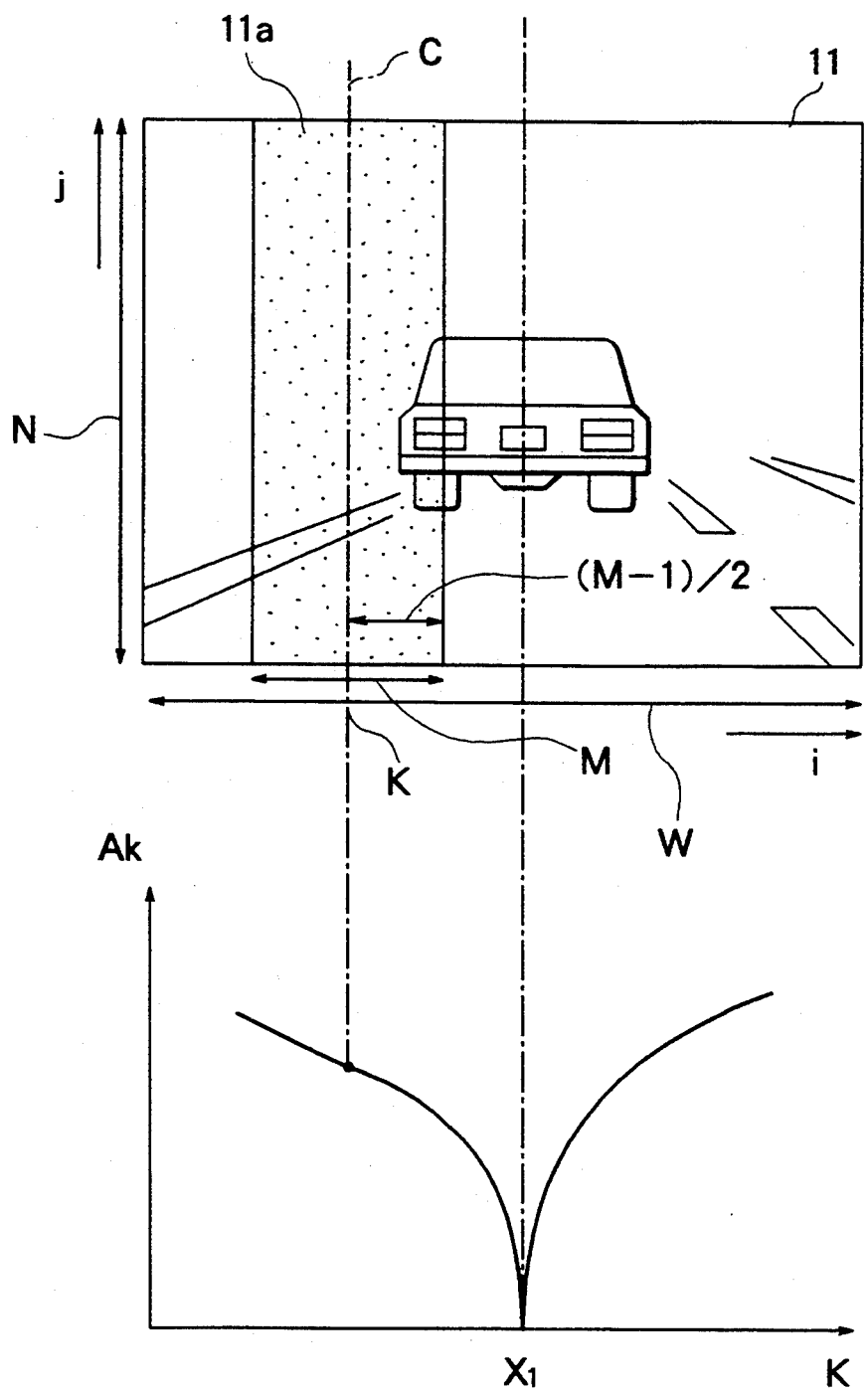
FIG. 3 shows a two-dimensional image 11 stored in the memory 8 (within the top rectangle), together with the variation of the function $A_K$ evaluating the bilateral symmetry of the image within the gate 11a with respect to the central axis C at K (bottom graph)

FIG. 3 shows a two-dimensional image 11 stored in the memory 8 (within the top rectangle), together with the variation of the function $A_K$ evaluating the bilateral symmetry of the image within the gate 11a with respect to the central axis C at K (bottom graph). As discussed above, the image 11 stored in the memory 8 consists of digital grey levels $S(i,j)$, where the indexes i and j represent the coordinates in the directions of the width and the height of the image. The width of the image 11 is represented by W, and hence the index i ranges from 0 to $(W-1)$. The height of the image 11 is represented by N, and hence the index j ranges from 0 to $(N-1)$. The evaluation function $A_K$ is calculated for each gate 11a successively shifting the gate within the image 11 from the left to the right end. The gate 11a is a window formed within the image 11, having width M substantially corresponding to the width of the object 5, and height N equal to that of the image 11. The position K of the central axis C of the gate 11a with respect to which the bilateral symmetry is evaluated ranges from $(M-1)/2$ to $(W-1)-(M-1)/2=W-(M/2)+(1/2)$. Here, it is assumed that M is an odd number, such that the gate 11a has an axis C at the center (see FIG. 3). The evaluation function $A_K$ for the gate 11a having the axis of evaluation at K ($K=(M-1)/2, \ldots, (W-1)-(M-1)/2$) is calculated by the following equation:

$$A_K = \sum_{j=0}^{N-1} \sum_{i=1}^{(M-1)/2} |S(K-i,j) - S(K+i,j)| \quad (2)$$

In the above equation (2), each summand $$|S(K-i,j) - S(K+i,j)|$$

is the absolute difference of the digital grey levels at the pixels $(K-i,j)$ and $(K+i,j)$, which are situated at the height j and laterally displaced from the central axis C (abscissa=K) by a left and a right displacement i, respectively. Thus, a smaller value of the $A_K$ indicates a greater degree of bilateral symmetry of the gate 11a with respect to the central axis C of the gate 11a. (Namely, the smaller the value of $A_K$, the greater the degree of symmetry.) The variation of the evaluation function $A_K$ with respect to the position K of the axis C of the gate 11a is plotted in the bottom graph in FIG. 3. The position $X_1$ at which the function $A_K$ takes its minimum is determined as the axis of symmetry of the image $S(i,j)$.

At step S102, the position of the symmetric axis $X_2$ of the right image $S'(i,j)$ formed upon the image sensor 4 and stored in the memory 9 in a digital form is determined. The position $X_2$ of the symmetric axis is determined in a manner similar to the above, using $S'(i,j)$ instead of $S(i,j)$.

Figure 4A:
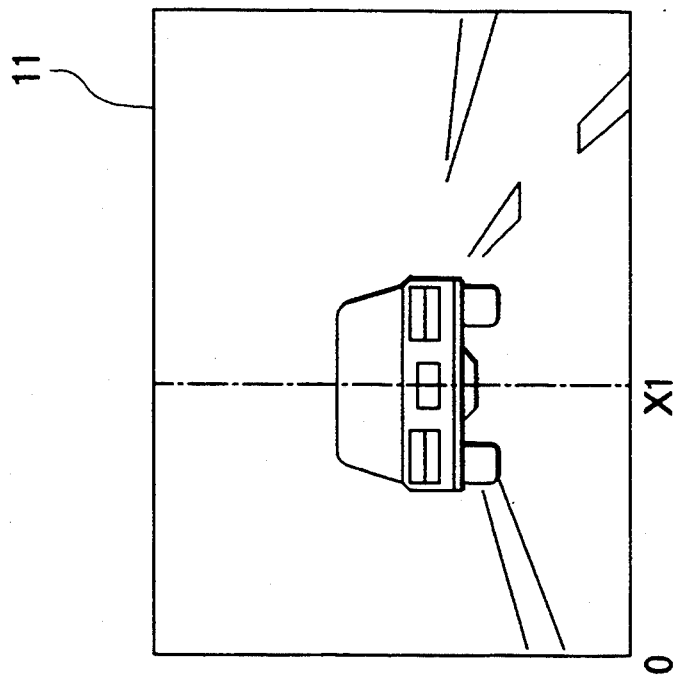
FIG. 4a shows the left image 11 stored in the memory 8, together with the position $X_1$ of the axis of symmetry.
Figure 4B:
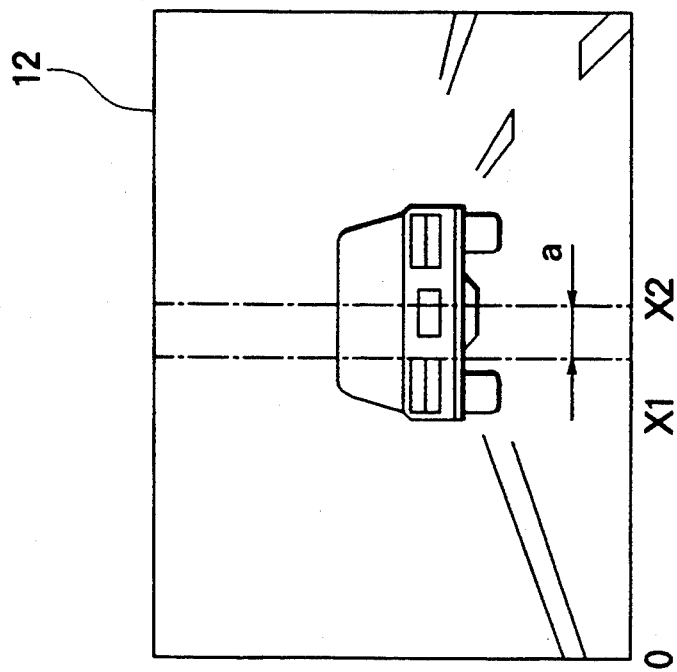
Figure 5:
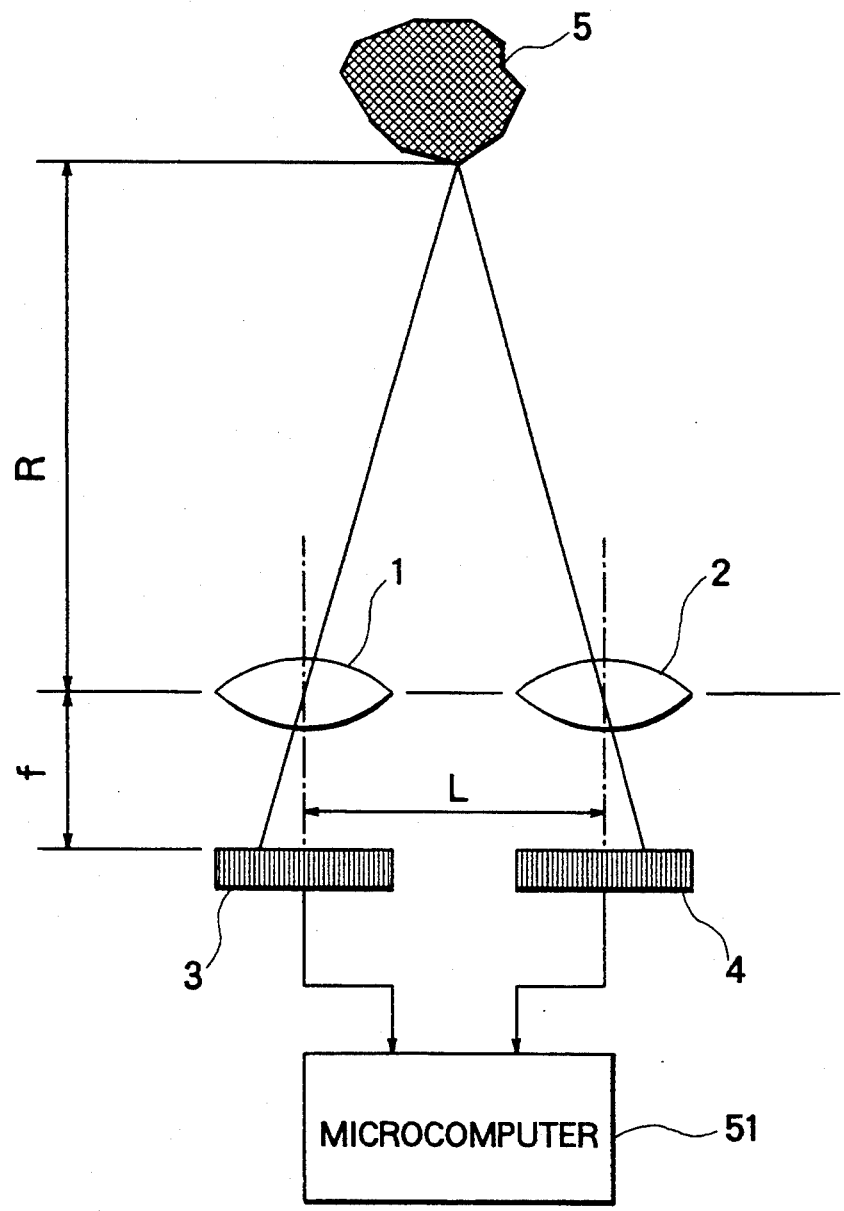
FIG. 5 is a diagram showing the principle of a conventional optical distance measurement device using image sensors.

At step S103, the absolute value of the shift a between the two images, namely, the absolute value of the difference between $X_1$ and $X_2$ is determined. FIG. 4a shows the left image 11 stored in the memory 8, together with the position $X_1$ of the axis of symmetry. FIG. 4b shows the right image 12 stored in the memory 9, together with the positions $X_1$ and $X_2$ of the axes of symmetry of the left and the right images, wherein the amount of shift between the two axes of symmetry is represented by a. The absolute difference or the amount of shift a between the two axes represents the parallax of the object 5 with respect to the left and right lenses 1 and 2 of the two optical systems. Thus, the distance R is calculated based upon the principle of principle of trigonometry by the equation (1):

$$R = f \times L / a \quad (1)$$

The distance to the object 5 is determined continuously in real time, by repeating the steps S101 through S104.

In the above description, the object 5 is assumed to be an automobile. However, the object 5 may be any body which exhibits bilateral symmetry, such as an air plane as viewed from the front or the rear, or a symmetric building. If the axis of the symmetry is not vertical, the position of the optical systems must be adjusted such that the lateral direction (the direction of base-line length L in FIG. 1) is perpendicular to the axis of symmetry of the object to which the distance is to be measured. Further, in the case of the above routine of FIG. 2, the positions of the symmetric axes of the left and the right images are detected successively in that order. However, the order of detection of the axes may be reversed, or the positions of the symmetric axes may be performed simultaneously if the hardware permits.

What is claimed is:

1. An optical distance measurement device for detecting a distance to an object exhibiting a substantial bilateral symmetry, comprising:
   a) first and second optical systems having optical axes separated from each other by a lateral distance substantially perpendicular to an axis of symmetry of said object, said first and second optical systems individually forming respective first and second images of the object, each image having a lateral width extending in a direction perpendicular to said axis of symmetry of said object;
   b) symmetric axis calculation means, coupled to said first and second optical systems, for individually determining respective laterally spaced positions of first and second symmetric axes of said object within said first and second images;
   c) shift calculation means, coupled to said symmetric axis calculation means, for calculating a separation between said lateral positions of said first and second symmetric axes; and
   d) distance calculation means, coupled to said shift calculation means, for calculating a distance to said object from said calculated separation between said lateral positions of said first and second symmetric axes.

2. An optical distance measurement device as claimed in claim 1, wherein said symmetric axis calculation means includes:
   means for forming a window within said first and second images, said window having a lateral width substantially corresponding to a width of said object;
   means for laterally translating said window within said first and second images;
   evaluation means for evaluating a degree of symmetry of an image within said window with respect to a central axis thereof; and
   means, coupled to said evaluation means, for individually determining a position of said central axis of said window within said first and second images at which said degree of symmetry evaluated by said evaluation means is at a maximum, said positions of said central axes within said first and second images constituting said respective laterally spaced positions of symmetric axes within said first and second images.

3. An optical distance measurement device as claimed in claim 1, wherein said first and second optical systems include image sensors upon which said first and second images are formed.

4. An optical distance measurement device as claimed in claim 1, wherein said distance calculation means calculates said distance to said object, on the basis of said separation between said respective laterally spaced positions of said first and second symmetric axes, based on a principle of trigonometry.

* * * * *